(12) United States Patent
Tate, Jr.

(10) Patent No.: US 9,671,242 B2
(45) Date of Patent: Jun. 6, 2017

(54) MULTIPLE ENERGY ROUTING SYSTEM

(75) Inventor: Edward D. Tate, Jr., Grand Blanc, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 832 days.

(21) Appl. No.: 13/324,524

(22) Filed: Dec. 13, 2011

(65) Prior Publication Data

US 2013/0151028 A1    Jun. 13, 2013

(51) Int. Cl.
G01C 21/34    (2006.01)
G01C 21/36    (2006.01)
G06Q 30/00    (2012.01)

(52) U.S. Cl.
CPC ................. G01C 21/3469 (2013.01)

(58) Field of Classification Search
CPC .... G01C 21/34; G01C 21/36; G01C 21/3469; G01C 21/3626; G01F 7/00; G08G 1/123; G06Q 30/00; G06Q 99/00; B60K 6/46; B60K 6/48; B60W 30/045; B60L 1/003; B60L 11/14; B60L 11/1842; B60T 7/22
USPC ............ 701/22, 31.4, 410, 422; 340/995.21; 705/7.13, 317
See application file for complete search history.

(56) References Cited

U.S. PATENT DOCUMENTS

| | | | |
|---|---|---|---|
| 8,290,701 B2 * | 10/2012 | Mason et al. | 701/422 |
| 8,301,323 B2 * | 10/2012 | Niwa | 701/22 |
| 2003/0006914 A1 * | 1/2003 | Todoriki | B60L 11/184 340/995.21 |
| 2008/0262668 A1 * | 10/2008 | Yamada | B60K 6/46 701/22 |
| 2010/0235030 A1 | 9/2010 | Xue et al. | |
| 2011/0246019 A1 * | 10/2011 | Mineta | B60W 20/00 701/31.4 |
| 2012/0022904 A1 * | 1/2012 | Mason | G01C 21/3469 705/7.13 |
| 2012/0173444 A1 * | 7/2012 | Zik | G06Q 10/10 705/317 |
| 2012/0179362 A1 * | 7/2012 | Stille | G01C 21/3469 701/410 |

FOREIGN PATENT DOCUMENTS

| | | |
|---|---|---|
| CN | 101522494 A | 9/2009 |
| CN | 101780774 A | 7/2010 |
| WO | 2005007444 A1 | 1/2005 |

* cited by examiner

*Primary Examiner* — Yuri Kan
(74) *Attorney, Agent, or Firm* — Lorenz & Kopf LLP (57) ABSTRACT

Methods, systems, and automotive vehicles are provided for providing routing for an automotive vehicle from a first location to a second location. The automotive vehicle is configured to operate using a primary energy source and a secondary energy source. An energy indicator is configured to provide a measure of available energy from the primary energy source onboard the automotive vehicle. A processor is coupled to the energy indicator, and is configured to ascertain characteristics of a plurality of segments connecting the first location and the second location, and to select an optimized route between the first location and the second location using the measure of available energy and the characteristics of the plurality of segments.

20 Claims, 4 Drawing Sheets

MULTIPLE ENERGY ROUTING SYSTEM

TECHNICAL FIELD

The present disclosure generally relates to the field of automotive vehicles and, more specifically, to automotive vehicles with a routing system that selects an optimized route of travel.

BACKGROUND

Many automotive vehicles include a navigation system that provides a recommended route for the vehicle to travel to a desired destination. However, the selection of a desired route using existing techniques may not always provide a truly optimal route for vehicles that use multiple sources of energy (such as a hybrid electric vehicle, by way of example).

Accordingly, it is desirable to provide methods for providing routing for automotive vehicles that use multiple sources of energy. It is further desirable to provide improved systems and vehicles that provide for such routing. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for providing routing for an automotive vehicle from a first location to a second location, the automotive vehicle configured to operate using a primary energy source and a secondary energy source onboard the automotive vehicle, is provided. The method comprises ascertaining a measure of available energy from the primary energy source, ascertaining characteristics of a plurality of segments connecting the first location and the second location, and selecting an optimized route between the first location and the second location using the measure of available energy and the characteristics of the plurality of segments.

In accordance with another exemplary embodiment, a system for providing routing for an automotive vehicle from a first location to a second location, the automotive vehicle configured to operate using a primary energy source and a secondary energy source onboard the automotive vehicle, is provided. The system comprises an energy indicator and a processor. The energy indicator is configured to provide a measure of available energy from the primary energy source. The processor is coupled to the energy indicator, and is configured to ascertain characteristics of a plurality of segments connecting the first location and the second location, and select an optimized route between the first location and the second location using the measure of available energy and the characteristics of the plurality of segments.

In accordance with a further exemplary embodiment, an automotive vehicle is provided. The automotive vehicle comprises an energy indicator, a drive system, and a processor. The energy indicator is configured to provide a measure of available energy from a primary energy source onboard the automotive vehicle. The drive system is configured to propel the automotive vehicle between a first location and a second location using the primary energy source, if the primary energy source is currently available onboard the automotive vehicle, and a secondary energy source, if the primary energy source is not currently available onboard the automotive vehicle. The processor is coupled to the energy indicator, and is configured to ascertain characteristics of a plurality of segments connecting the first location and the second location, and select an optimized route between the first location and the second location using the measure of available energy and the characteristics of the plurality of segments.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
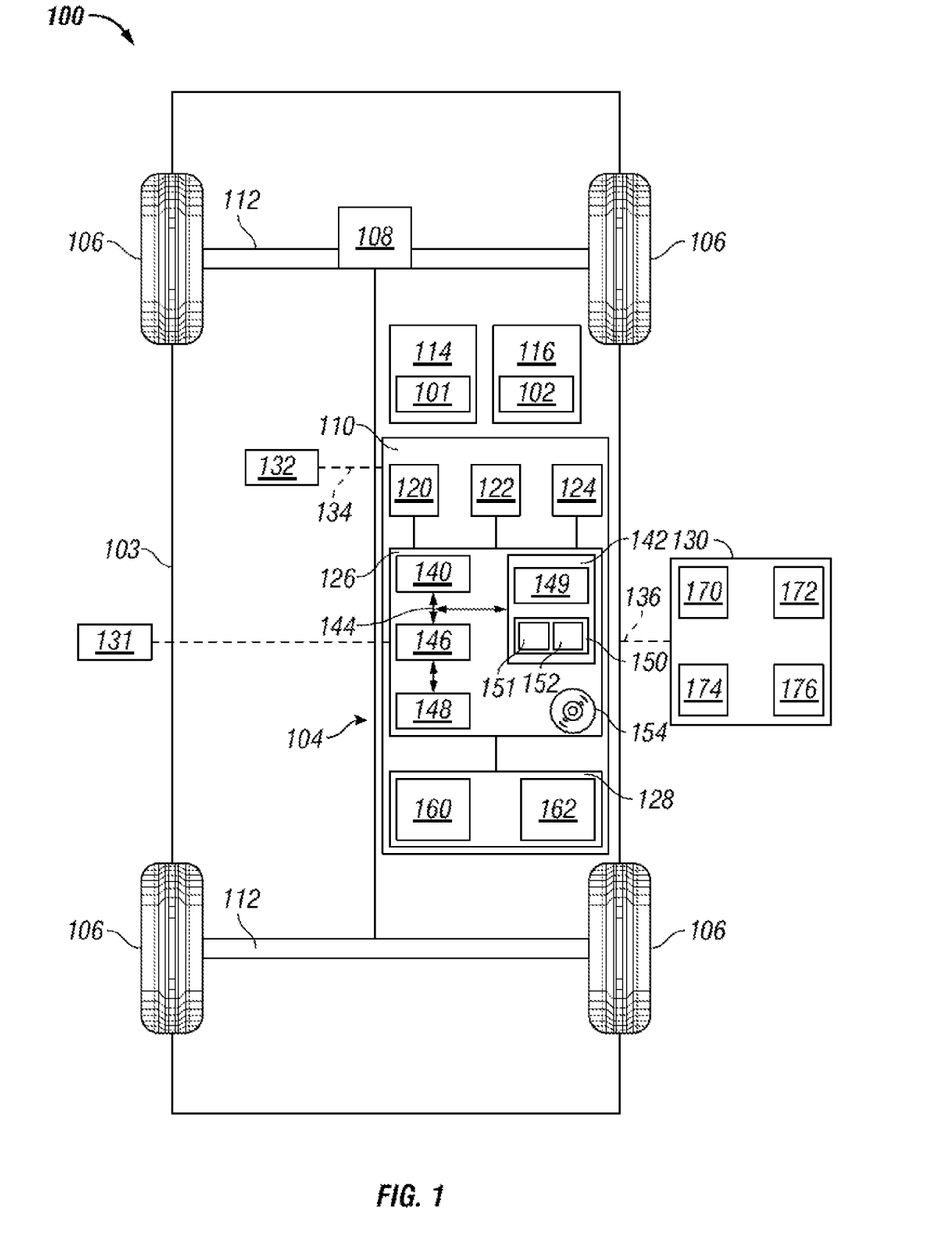
FIG. 1 is a plan view of an automotive vehicle having a routing functionality based on characteristics of multiple sources of energy sources used by the vehicle, in accordance with an exemplary embodiment.

FIG. 1 illustrates an automotive vehicle 100, (or automobile, or vehicle) according to an exemplary embodiment. The vehicle 100 operates on a primary energy source 101 and a secondary energy source 102. The vehicle 100 utilizes energy efficient routing based upon a measure of availability of the primary energy source 101 on board the vehicle, cost functions of the primary and secondary energy sources 101, 102, and characteristics of road segments between an origin and an intended destination for the vehicle 100, as provided in greater detail below. As depicted in FIG. 1, the vehicle includes a body 103, a chassis 104, a plurality of wheels 106, a drive system 108, and a navigation system 110.

The body 103 is arranged on the chassis 104, and substantially encloses the other components of the vehicle 100. The body 103 and the chassis 104 may jointly form a frame. The wheels 106 are each rotationally coupled to the chassis 104 near a respective corner of the body 103 to facilitate movement of the vehicle 100. In a preferred embodiment, the vehicle 100 includes four wheels 106, although this may vary in other embodiments (for example for trucks and certain other automotive vehicles).

The drive system 108 is mounted on the chassis 104, and drives the wheels 106 via one or more drive shafts 112 coupled to the wheels 106. The drive system 108 comprises a propulsion system that propels the vehicle 100 between a first location (at which the vehicle 100 is currently located, or from which a current drive or ignition cycle begins) and a second location (namely, a destination as selected by a user of the vehicle) using the primary and secondary energy sources 101, 102. The drive system 108 preferably operates using the primary energy source 101 (for example, electric energy) provided that the primary energy source 101 is available onboard the vehicle 100, and operates using the secondary energy source 102 (such as gasoline or diesel fuel) when the primary energy source is not available onboard the vehicle 100.

In certain exemplary embodiments, the drive system 108 comprises a combustion engine and/or an electric motor/generator, coupled with a transmission thereof. In certain embodiments, the drive system 108 may vary, and/or two or more drive systems 108 may be used. By way of example, the vehicle 100 may also incorporate any number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

The navigation system 110 provides information to occupants of the vehicle, including providing a recommended route of travel for the vehicle to a desired destination based on availability and characteristics of the primary energy source 101 and the secondary energy source 102 onboard the vehicle 100 and characteristics of nearby road segments. In certain embodiments the navigation system 110 is configured to interface directly or indirectly with a remote server 130 and/or a user wireless device 132 of a vehicle occupant (such as a cellular telephone and/or short-range wireless device). In certain other embodiments, the remote server 130 and/or the user wireless device 132 may include some or all of the components of, and/or perform some or all of the functions of, the navigation system 110.

The navigation system 110 is preferably disposed onboard the vehicle 100, and is coupled to a first energy indicator 114 and a second energy indicator 116. The first energy indicator 114 measures an indication as to a measure of availability of the primary energy source 101. The second energy indicator 116 measures an indication as to a measure of availability of the secondary energy source 102. For example, in one embodiment, the primary energy source comprises electrical energy as utilized via a rechargeable energy storage system (RESS), such as a battery, and the first energy indicator 114 comprises a sensor and/or system configured to measure a state of charge of the RESS. Also in one such exemplary embodiment, the secondary energy source comprises gasoline, and the second energy indicator 116 comprises a sensor that measures a level of gasoline in a fuel tank of the vehicle.

The input device 120 is configured to obtain inputs from a user, preferably from one or more occupants of the vehicle, including information as to a desired destination of travel for the vehicle during a current vehicle drive (or ignition cycle) of the vehicle. By way of example only, the input device 120 may include one or more buttons, switches, rotary knobs, touch screens, touch panels, capacity panels, swipe operations, and/or one or more other types of devices. As explained in greater detail below, the navigation system 110 determines a recommended route of travel for the vehicle 100 based on a measure of availability of the primary energy source 101 and characteristics of segments connecting a current location of the vehicle 100 with a desired destination location.

The receiver 122 is configured to receive signals and/or information pertaining to the vehicle. The receiver 122 receives information regarding the availability of the primary energy source 101 and the secondary energy source 102, preferably from the first and second energy indicators 114, 116, respectively (for example, via a vehicle communications and/or a wireless connection). The receiver 122 receives signals and information regarding a current geographic position or location of the vehicle from one or more satellites 131 or as part of a global positioning system (GPS). In certain embodiments, the receiver 122 receives signals via a first wireless connection 134 (such as a Bluetooth or other short range wireless connection) from the user wireless device 132. In addition, in certain exemplary embodiments, the receiver 122 receives signals and information from the remote server 130 via a second wireless connection 136 (such as a cellular wireless network). In one embodiment, wireless connections 134, 136 comprise different types of wireless connections. In another embodiment, wireless connections 134, 136 comprise one or more common or identical wireless connections. The receiver 122 provides the signals and/or information to the computer system 126 for processing, and ultimately for use in selecting an optimal (or recommended) route of travel for the vehicle 100.

The transmitter 124 is configured to transmit signals and/or information pertaining to the vehicle. In an exemplary embodiment, the transmitter 124 transmits signals and information regarding a current geographic position or location of the vehicle to the remote server 130. In addition, the transmitter 124 may also transmit signals and information regarding the current geographic position of the vehicle, and/or a desired route of travel for the vehicle.

The computer system 126 is coupled between the input device 120, the receiver 122, the transmitter 124, and the display and notification unit 128. The computer system 126 receives the above-described signals, information, and user inputs from the receiver 122, the transmitter 124, and the input device 120. The computer system 126 processes the various signals, information, and user inputs and provides instructions for the display and notification unit 128 and/or the transmitter 124 to provide a recommended route of travel for the vehicle to the desired destination based on the availability and characteristics of the primary energy source 101 and the secondary energy source 102 and characteristics of road segments leading to the destination. In addition, in certain embodiments, the computer system 126 also provides instructions for the transmission of signals and information by the transmitter 124 to the remote server 130 for remote, off-board storage or processing, and may also receive information and/or instructions from the remote server 130 via the receiver 122.

As depicted in FIG. 1, the computer system 126 includes a processor 140, a memory 142, a computer bus 144, an interface 146, and a storage device 148. The processor 140 performs the computation and control functions of the computer system 126 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 140 executes one or more programs 149 preferably stored within the memory 142 and, as such, controls the general operation of the computer system 126.

The processor 140 receives the above-referenced signals, information, and user inputs from the receiver 122 and the input device 120 (and, in certain embodiments, from the remote server 130, the wireless device 132, and/or one or more other devices and/or systems). The processor 140 processes the signals, information, and user inputs and provides instructions to the display and notification unit 128 and/or the transmitter 124 to provide a recommended route of travel for the occupants of the vehicle. In addition, in certain embodiments, the processor 140 also provides instructions for the transmission of signals and information by the transmitter 124 to the remote server 130 for remote storage or processing. The processor 140 preferably performs these functions in accordance with the steps of the process 200 described further below in connection with FIGS. 2-4. In addition, in one exemplary embodiment, the processor 140 performs these functions by executing one or more of the above-referenced programs 149 stored in the memory 142.

The memory 142 stores one or more programs 149 for implementing the process 200 described further below in connection with FIG. 2. In addition, the memory 142 stores additional values 150, including a first function 151 pertaining to costs and/or other characteristics of the primary energy source 101 and a second function 152 pertaining to costs and/or other characteristics of the secondary energy source 102. In one embodiment, the first and second functions 151, 152 pertain to monetary costs of operating the vehicle 100 using the primary and secondary energy sources 101, 102, respectively. In another embodiment, the first and second functions 151, 152 pertain to energy usage associated with the primary and secondary energy sources 101, 102, respectively. In yet another embodiment, the first and second functions 151, 152 pertain to carbon content and/or emissions characteristics of the primary and secondary energy sources 101, 102, respectively. In yet another embodiment, the first and second functions 151, 152 pertain to measures of renewability of the primary and secondary energy sources 101, 102, respectively.

The memory 142 can be any type of suitable memory. This would include the various types of dynamic random access memory (DRAM) such as SDRAM, the various types of static RAM (SRAM), and the various types of non-volatile memory (PROM, EPROM, and flash). In certain embodiments, the memory 142 is located on and/or co-located on the same computer chip as the processor 140. It should be understood that the memory 142 may be a single type of memory component, or it may be composed of many different types of memory components. In addition, the memory 142 and the processor 140 may be distributed across several different computers that collectively comprise the computer system 126. For example, a portion of the memory 142 may reside on a computer within a particular apparatus or process, and another portion may reside on a remote computer off-board and away from the vehicle, for example as part of the remote server 130.

The computer bus 144 serves to transmit programs, data, status and other information or signals between the various components of the computer system 126. The computer bus 144 can be any suitable physical or logical means of connecting computer systems and components. This includes, but is not limited to, direct hard-wired connections, fiber optics, infrared and wireless bus technologies.

The interface 146 allows communication to the computer system 126, for example from a vehicle occupant, a system operator, a remote, off-board database or processor, and/or another computer system, and can be implemented using any suitable method and apparatus. In certain embodiments, the interface 146 receives input from an occupant of the vehicle, preferably via the input device 120 of FIG. 1.

The storage device 148 can be any suitable type of storage apparatus, including direct access storage devices such as hard disk drives, flash systems, floppy disk drives and optical disk drives. In one exemplary embodiment, the storage device 148 comprises a program product from which the memory 142 can receive a program 149 that executes the process 200 of FIG. 2 and/or steps thereof as described in greater detail further below. Such a program product can be implemented as part of, inserted into, or otherwise coupled to the navigation system 110. In another exemplary embodiment, the program product may be directly stored in and/or otherwise accessed by the memory 142 and/or a disk (e.g., disk 154), such as that referenced below.

As shown in FIG. 1, the storage device 148 can comprise a disk drive device that uses disks 154 to store data. As one exemplary implementation, the computer system 126 may also utilize an off-board/off-vehicle Internet website, for example for providing or maintaining data or performing operations thereon.

It will be appreciated that while this exemplary embodiment is described in the context of a fully functioning computer system, those skilled in the art will recognize that certain mechanisms of the present disclosure may be capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 140 and/or the processor 170) to perform and execute the program. Such a program product may take a variety of forms, and that the present disclosure applies equally regardless of the particular type of computer-readable signal bearing media used to carry out the distribution. Examples of signal bearing media include: recordable media such as floppy disks, hard drives, memory cards and optical disks (e.g., disk 154), and transmission media such as digital and analog communication links. It will similarly be appreciated that the computer system 126 may also otherwise differ from the embodiment depicted in FIG. 1, for example in that the computer system 126 may be coupled to or may otherwise utilize one or more remote, off-board computer systems and/or other navigation systems, for example as part of the remote server 130. As used throughout this application, a remote computer system refers to a computer system that is off-board and outside the vehicle. For example, a remote computer system may be at a central processing facility for use with a number of different vehicles, among other possible examples.

The display and notification unit 128 is coupled to the computer system 126. In a preferred embodiment, the display and notification unit 128 comprises a visual component 160 (preferably a display screen, such as a liquid crystal display (LCD) screen) that generates images that are visible to occupants of the vehicle, and an audio component 162 (such as a speaker) that generates sounds that can be heard by the occupants of the vehicle. It will be appreciated that the display and notification unit 128 may comprise one or more visual components 160 and/or audio components 162 together as one system and/or as separate systems.

As mentioned above, in certain embodiments, various functions of the navigation system 110 may be performed by the remote server 130 and/or the wireless device 132. The remote server 130 includes a processor 170, a memory 172, a transmitter 174, and a receiver 176. In certain embodiments, the remote processor 170, memory 172, transmitter 174, and receiver 176 of the remote server 130, are similar to, and may perform some or all of the respective functions of (or functions similar to) the processor 140, memory 142, transmitter 124, and receiver 122, respectively, of the navigation system 110. In certain embodiments, the wireless device 132 may also include similar components, features, and functionality. Also in certain embodiments, the remote server 130 (or components thereof), the wireless device 132, and/or the navigation system 110 (or components thereof) may together form a single system.

Figure 2:
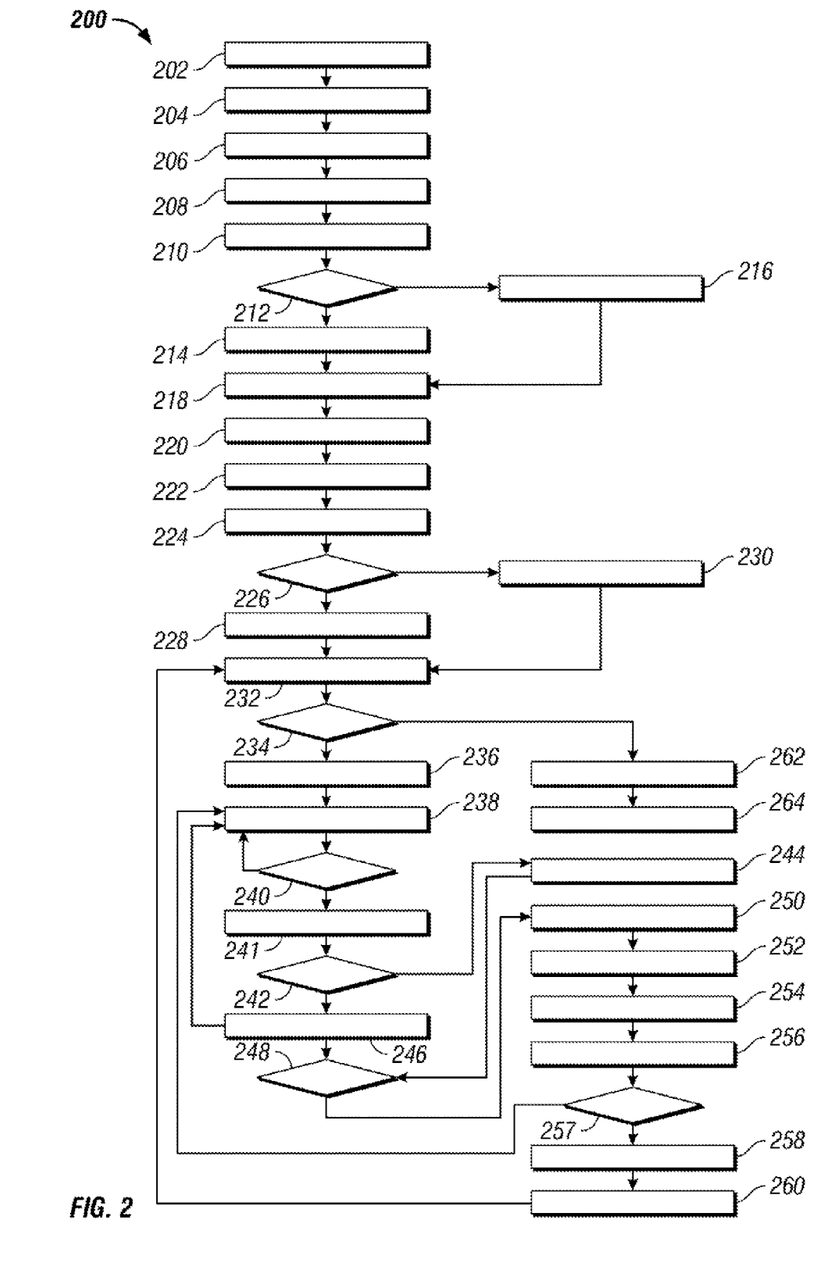
FIG. 2 is a flow chart of a method for providing routing functionality based on characteristics of multiple sources of energy sources used by the vehicle for a vehicle, and that can be implanted in connection with the vehicle of FIG. 1, in accordance with an exemplary embodiment.

FIG. 2 is a flow chart of a process 200 for providing routing for a vehicle from a first location to a second location, in accordance with an exemplary embodiment. In a preferred embodiment, the process 200 can be implemented in connection with the vehicle 100, the navigation system 110, the remote server 130, and/or the wireless device 132 of FIG. 1. The process 200 will also be described below in conjunction with FIGS. 3 and 4, which provide graphical illustrations of certain exemplary implementation of the process 200 of FIG. 2 in accordance with exemplary embodiments.

As depicted in FIG. 2, the process 200 includes the step of obtaining user information (step 202). The user information includes information as to preferred destination of travel for the vehicle during a current vehicle drive (or ignition cycle) for the vehicle. The desired destination for travel of the vehicle as obtained in step 202 is referred to herein as the "destination" or the "second location". In one embodiment, the user information is obtained from a driver or other user of the vehicle via the input device 120 of FIG. 1. In another embodiment, the user input is obtained from the wireless device 132 of FIG. 1. The desired destination for travel of the vehicle as obtained in step 202 is referred to herein as the "destination" or the "second location". Also in a preferred embodiment, the receiver 122 provides a signal indicative of the destination to the processor 140 of the computer system 126 of FIG. 1 for processing. With reference to the exemplary implementations of FIGS. 3 and 4, the destination is represented by node 302 in FIG. 3 and node 420 in FIG. 4.

In addition, a vehicle location is determined (step 204). In a preferred embodiment, the vehicle location comprises a geographic position of the vehicle at the beginning of a current vehicle drive or ignition cycle, and/or a geographic position of the vehicle at a time in which the user has provided inputs as to a desired destination for step 202. The vehicle location of step 204 is referred to herein as the "origin" or the "first location". The vehicle location and/or information pertaining thereto is preferably obtained by the receiver 122 of FIG. 1, most preferably via satellite signals provided by one or more satellites 131 of FIG. 1 coupled thereto as part of a global positioning system. In certain embodiments, the receiver 122 of FIG. 1 may receive the vehicle location and/or information pertaining thereto from another source, such as from the wireless device 132 and/or the remote server 130 of FIG. 1. Also in a preferred embodiment, the receiver 122 provides a signal indicative of the origin to the processor 140 of the computer system 126 of FIG. 1 for processing. With reference to the exemplary implementations of FIGS. 3 and 4, the origin is represented by node 301 in FIG. 3 and node 416 in FIG. 4 (described in greater detail further below).

In addition, characteristics of the vehicle being driven are obtained (step 206). In a preferred embodiment, the vehicle characteristics of step 206 include the types of the primary and secondary energy sources used to power the vehicle along with measures of economy of energy usage for the vehicle with respect to both the primary and secondary energy sources. For example, in one such preferred embodiment, the vehicle characteristics of step 206 include measures of energy economy for the vehicle, for each of the primary and secondary energy sources, at different vehicle speeds and on different types of road segments (such as highway driving, city driving, and the like). The vehicle characteristics are preferably stored in the memory 142 of FIG. 1 and retrieved therefrom by the processor 140 of FIG. 1.

A measure is obtained as to the availability of the primary energy source onboard the vehicle (step 208). In one embodiment, the measure of step 208 comprises an amount of energy of the primary energy source that is available onboard the vehicle for operating the vehicle. In another embodiment, the measure of step 208 comprises an estimated distance that the vehicle can be driven while the vehicle is operated using the available energy of the primary energy source that is onboard the vehicle. The measure of step 208 is preferably provided by the first energy indicator 114 of FIG. 1 and/or calculated by the processor 140 of FIG. 1 based on measurements and/or other information provided thereto by the first energy indicator 114 of FIG. 1. For example, in one embodiment, if the primary energy source comprises electrical energy as utilized via an RESS, then the measure of step 208 may be ascertained based on a state of charge of the RESS. By way of further example, in another embodiment, if the primary energy source comprises gasoline, then the measure of step 208 may be ascertained based on a level of gasoline in a fuel tank of the vehicle.

A heuristic cost is determined between the origin of step 204 and the destination of step 202 (step 210). In one preferred embodiment, the heuristic cost of step 210 comprises a "best case" estimate as to an amount of energy that would be used by the vehicle in travelling from the origin to the destination, using only the primary energy source, and under ideal conditions for primary energy source usage. Specifically, in one preferred embodiment, the heuristic cost of step 210 is determined by calculating a Euclidean, straight line distance between the origin and the destination (for example, "as the crow flies", without regard to the direction of road segments therebetween), and determining an amount of energy usage that would be required for the vehicle to travel using the primary energy source along this distance assuming that the posted speed limits, concentration of traffic lights, and traffic patterns along this distance are ideal for energy economy for usage of the primary energy source. The heuristic cost of step 210 is preferably calculated by the processor 140 of FIG. 1.

A determination is then made as to whether there is sufficient availability of the primary energy source onboard the vehicle to travel from the origin to the destination under the heuristic assumptions of step 210 (step 212). The determination of step 212 is preferably made based on the measure of availability of the primary energy source from step 208 and the heuristic cost of step 210. Specifically, in one embodiment, the determination of step 212 is based on whether the measure of availability of the primary energy source of step 208 is greater than or equal to the heuristic cost of step 210. The determination of step 212 is preferably made by the processor 140 of FIG. 1.

If it is determined that there is sufficient availability of the primary energy source onboard the vehicle to travel from the origin to the destination under the heuristic assumptions of step 210, then a scaling factor for the process is set equal to the best case (i.e., lowest, or most energy efficient) energy usage for the primary energy source per unit of distance (for example, kilowatts per mile) assuming ideal travel conditions for the primary energy source (such as posted speed limits, concentration of traffic lights, and traffic patterns that are most energy efficient for the primary energy source) and utilizing the first function 151 of FIG. 1 (step 214). Conversely, if it is determined that there is not sufficient availability of the primary energy source onboard the vehicle to travel from the origin to the destination under the heuristic assumptions of step 210, then the scaling factor for the process is instead set equal to the best case (i.e., lowest, or most energy efficient) energy usage for the secondary energy source per unit of distance (for example, kilowatts per mile) assuming ideal travel conditions for the secondary energy source (such as posted speed limits, concentration of traffic lights, and traffic patterns that are most energy efficient for the secondary energy source) and utilizing the second function 152 of FIG. 1 (step 216). The scaling factor of either step 214 or step 216 (whichever is calculated) is used in assessing nearby travel nodes for consideration for possible inclusion in the recommended route of travel for the vehicle, as discussed further below.

An open set of possible nodes is initiated (step 218). The open set of nodes changes throughout various iterations. At any particular point in time, the open set comprises a set of nodes that are to be examined for possible inclusion in the recommended route. During a first iteration, the open set is initialized to comprise the origin of step 204. The open set is preferably initiated and updated by the processor 140 of FIG. 1.

A closed set of possible nodes is also initiated (step 220). The closed set of nodes also changes throughout various iterations. At any particular point in time, the closed set comprises a set of nodes that have already been considered for possible inclusion in the recommended route (as used herein, the terms "recommended route", "optimal route", and "selected route" are synonymous with one another). During a first iteration, the closed set is initialized to comprise an empty set. In one embodiment, each node represents a point in a path or roadway that is a predetermined distance from a preceding node, or that represents a turn in direction or fork in the road from a segment of a preceding node. In one such embodiment, the predetermined distance is equal to one hundred feet; however, this may vary in other embodiments. The closed set is preferably initiated and updated by the processor 140 of FIG. 1.

An identification is made as to nodes that satisfy the criteria for inclusion as candidates for the recommended route of travel (step 222). Preferably, a map stored in the memory 142 of FIG. 1 is utilized to identify various travel nodes that are between the origin of step 204 and the destination of step 202 and/or that may be close enough to one or both of the origin and/or the destination so as to be within a feasibility boundary for the recommended route of travel, using an appropriate scaling factor from step 214 or 216. Specifically, if it was determined in step 212 that there is sufficient availability of the primary energy source onboard the vehicle to travel from the origin to the destination under the heuristic assumptions of step 210, then the scaling factor of step 214 (using the first function 151 of FIG. 1) is utilized in step 222. Conversely, if it was determined in step 212 that there is not sufficient availability of the primary energy source onboard the vehicle to travel from the origin to the destination under the heuristic assumptions of step 210, then the scaling factor of step 216 (using the second function 152 of FIG. 1) is utilized instead in step 222. The identification of step 222 is preferably made by the processor 140 of FIG. 1.

A heuristic distance is calculated for each of the nodes identified during step 222 (step 224). In one preferred embodiment, for each node, the heuristic distance is a Euclidean, straight line distance between the origin and the node (for example, "as the crow flies", without regard to the direction of road segments therebetween). The heuristic distance is preferably calculated by the processor 140 of FIG. 1.

A separate determination is then made for each node identified in step 222 as to whether there is sufficient availability of the primary energy source onboard the vehicle to travel from the origin to the node under a best case scenario for use of the primary energy source (preferably, similar to the heuristic assumptions of step 210, for example including optimal posted speed limits, concentration of traffic lights, traffic patterns, and the like) (step 226). The determinations of step 226 are preferably made based on the measure of availability of the primary energy source from step 208, the distance of step 224, and the first function 151 of FIG. 1 for the primary energy source.

In steps 228 and 230 described below, a first score (referred to herein as a "G-Score") is then determined for each of the nodes identified in step 222 and stored in memory. The G-Score of a particular node represents an estimated energy cost of travelling from the origin to the particular node. The calculation of the G-Score for a particular node is dependent upon the distance of step 224 and the determination of step 226 of the respective node. Specifically, if it is determined in step 226 that there is sufficient availability of the primary energy source onboard the vehicle to travel from the origin to the node under consideration, then the G-Score is calculated based on the distance of step 224 for the particular node and the first function 151 of FIG. 1 for the primary energy source (step 228). Conversely, if it is determined in step 226 that there is not sufficient availability of the primary energy source onboard the vehicle to travel from the origin to the node under consideration, then the G-Score is calculated instead based on the distance of step 224 for the particular node and the second function 152 of FIG. 1 for the secondary energy source (step 230). The G-Score is preferably calculated by the processor 140 of FIG. 1 and stored in the memory 142 for subsequent usage during the process (for example, in step 248, described further below).

A current node is selected from the list of nodes identified in step 222 (step 232). In a first iteration of step 232, the current node comprises the origin of step 204, or the node at which the vehicle is currently positioned. In subsequent iterations, the current node comprises a node along a path between the origin of step 204 and the destination of step 202 that is currently under consideration. The current node is preferably selected by the processor 140 of FIG. 1.

A determination is made as to whether the current node of step 232 represents the destination of step 202 (step 234). This determination is preferably made by the processor 140 of FIG. 1. If it is determined that the current node represents the destination, then the process proceeds to steps 262 and 264, described further below. Conversely, if it is determined that the current node does not represent the destination, then the process proceeds instead to step 236, described directly below.

An identification is made as to each of the neighbor nodes near the current node of step 232 (step 236). Specifically, during step 236, an identification is made as to each of the nodes of step 222 that are immediately adjacent to, or are connected by a single road segment to, the current node of step 232. By way of example, with reference to FIG. 4, the origin 416 of FIG. 4 has four neighbor nodes, namely, node 409, node 415, node 417, and node 423. The neighbor nodes are preferably identified by the processor 140 of FIG. 1.

One of the neighbor nodes of step 236 is then selected for analysis (step 238). Preferably, each of the neighbor nodes is analyzed, one at a time, each in a different iteration. The selection of the neighbor in step 238 may be selected at random, or based on direction (for example, East or West, North or South, clockwise or counterclockwise, or the like). The selection of the neighbor is preferably made by the processor 140 of FIG. 1.

A determination is made as to whether the selected neighbor of step 238 is a member of the closed set of step 220 (step 240). This determination is preferably made by the processor 140 of FIG. 1. If it is determined that the selected neighbor is in the closed set (that is, that the selected neighbor has already been analyzed for possible inclusion in the optimal route), then the process returns to step 238, and a different neighbor node is selected. Steps 238 and 240 repeat in this manner until a neighbor node is selected that is not in the closed set. Once it is determined in an iteration of step 240 that the selected neighbor of the most recent iteration of step 238 is not in the closed set, then the process proceeds to step 241, described directly below.

During step 241, various characteristics are obtained regarding the selected neighbor node of the most recent iteration of step 238. The characteristics preferably pertain to various characteristics of a road segment connecting the selected neighbor node of step 238 with the current node of step 232. The characteristics preferably include a distance of the road segment, a grade or angle of the road segment, posted speed limits (and/or an average posted speed limit), a measure of a concentration of traffic lights along the road segment, historical traffic patterns (such as historical average driving speeds) along the road segment, and/or real-time driving conditions along the road segment (e.g., a current average speed along the road segment, weather conditions along the road segment, any accidents or traffic slowdowns along the road segment, or the like). The characteristics are preferably obtained by the processor 140 of FIG. 1. Certain of the characteristics (for example, the historical data) may be obtained by the processor 140 of FIG. 1 from data stored in the memory 142 of FIG. 1, while certain other of the characteristics (for example, the real-time data) may be obtained from the remote server 130 and/or the wireless device 132 of FIG. 1.

A determination is made as to whether there is sufficient availability of the primary energy source to travel from the origin to the neighbor node of step 238 via the current node of step 232 (step 242). Preferably, during step 242 an updated estimate of the availability of the primary energy source is utilized from previous calculations (in a prior iteration) as to the amount of energy usage that would be required to travel from the origin to the current node of step 232. The first function 151 of FIG. 1 is then applied to the road segment characteristics of step 241 to determine an incremental energy cost of travelling from the current node of step 232 to the neighbor node of step 238.

If the incremental energy cost is less than or equal to the updated estimate of the availability of the primary energy source after reaching the current node of step 232, then it is determined that there is sufficient availability of the primary energy source for travel to the neighbor node of step 238. Accordingly, a temporary G-Score is calculated for the neighbor node based on usage of the primary energy source (step 244). During step 244, the temporary G-Score is calculated based on the characteristics of step 241 of the road segment between the current node and the neighbor node and the first function 151 of FIG. 1 pertaining to the primary energy source. The temporary G-Score of step 244 is preferably calculated by the processor 140 of FIG. 1.

Conversely, if the incremental energy cost is greater than the updated estimate of the availability of the primary energy source after reaching the current node of step 232, then it is determined that there is not sufficient availability of the primary energy source for travel to the neighbor node of step 238. Accordingly, a temporary G-Score is calculated for the neighbor node based instead on usage of the secondary energy source (step 246). During step 246, the temporary G-Score is calculated based on the characteristics of step 241 of the road segment between the current node and the neighbor node and the second function 152 pertaining to the secondary energy source. The temporary G-Score of step 246 is preferably calculated by the processor 140 of FIG. 1.

A determination is made as to whether the temporary G-Score of step 244 or step 246 (whichever is calculated in a particular iteration, based on the determination of step 242, described above) is less than the stored G-Score of step 228 or step 230 (whichever was calculated for that particular node) (step 248). This determination is preferably made by the processor 140 of FIG. 1.

If it is determined that the temporary G-Score of steps 244, 246 is greater than or equal to the stored G-Score of steps 228, 230 for the particular node under consideration as the neighbor node of step 238 for a particular iteration, then the process returns to step 238, as a new neighbor node is selected that is also adjacent to the current node of step 232. Steps 238-248 thereafter repeat in a new iteration for this newly selected neighbor node.

Conversely, if it is determined that the temporary G-Score of steps 244, 246 is less than the stored G-Score of steps 228, 230 for the particular node under consideration as the neighbor node of step 238 for a particular iteration, then the G-Score of the particular node under consideration is re-set to equal the temporary G-Score of step 244 or step 246 (whichever was calculated for the particular node under consideration) (step 250). This step is preferably performed by the processor 140 of FIG. 1.

In addition, a second score (referred to herein as an "H-Score") is also calculated for this node (step 252). As referenced herein, the H-Score represents an expected energy cost, preferably a heuristic expected energy cost, for the vehicle to travel from the node under consideration to the destination of step 202. Similar to the Heuristic G-Score of steps 224-230, the calculation of the H-Score preferably includes the determination of a Heuristic distance between the node under consideration and the destination (most preferably a Euclidean or straight line distance "as the crow flies"), a determination of whether there is sufficient availability of the primary energy source onboard the vehicle to complete travel between the node and the destination, and the application of (i) the first function 151 of FIG. 1 if there is sufficient availability of the primary energy source for the vehicle to travel between the node and the destination, or (ii) the second function 152 of FIG. 1 if there is not sufficient availability of the primary energy source for the vehicle to travel between the node and the destination. The H-Score is preferably calculated by the processor 140 of FIG. 1.

A third score (referred to herein as an "F-Score") is also calculated for this node (step 254). As referenced herein, the F-Score represents an expected energy cost for the vehicle to travel from the origin to the destination through the node under consideration, preferably via a most energy-efficient route of travel of those potential routes of travel between the origin and the destination that pass through the node under consideration. The F-Score is preferably calculated by the processor 140 of FIG. 1 by adding together the G-Score (as updated in step 250) to the H-Score (as calculated in step 252).

In addition, the current node of step 232 is identified as the "parent" node for the neighbor node under consideration and stored in memory (step 256). Preferably, this identification is made by the processor 140 of FIG. 1 and stored in the memory 142 of FIG. 1.

A determination is then made as to whether there are any additional neighbor nodes of step 236 remaining for consideration for the current node of step 232 (step 257). This determination is preferably made by the processor 140 of FIG. 1. If it is determined in step 257 that there are any additional neighbor nodes still to be considered, then the process returns to step 238, as a new neighbor node is selected. Steps 238-257 repeat in new iteration(s) until it is determined in an iteration of step 257 that all of the neighbor nodes have been considered for the current node.

Once a determination is made that each of the neighbor nodes for the current node has been considered, then a determination is made as to which of the neighbor nodes under consideration for the current node has the lowest F-Score (step 258). This determination is preferably made by the processor 140 of FIG. 1. The selected neighbor node of step 258 with the lowest F-Score is then moved to the closed step and identified as the new "current node" (step 260). Steps 258 and 260 are preferably performed by the processor 140 of FIG. 1.

The process then returns to step 232, and steps 232-260 repeat in a new iteration with the node selected in step 258 serving as the "current node" in the next iteration. Steps 232-260 repeat in this manner for various other iterations, each having a new, updated "current node", until a determination is made in an iteration of step 234 that the current node is the desired destination of step 202. Once it is determined in an iteration of step 234 that the current node is the same as the destination, the process has found an optimal route for the vehicle to travel from the origin to the destination.

Accordingly, the optimal path is reconstructed by linking together the "parent" nodes of the selected current nodes in succession (step 262). This is preferably performed by the processor 140 of FIG. 1. In addition, the optimal (or recommended) route is presented to the vehicle users (step 264). Specifically, the optimal route is preferably provided for the driver and/or other occupants or users of the vehicle via the navigation system 110 of FIG. 1 for display on the display and notification unit 128 (for example, via the visual component 160 and the audio component 162) via instructions provided by the processor 140 of FIG. 1. In certain embodiments, the optimal (or recommended) route is provided instead for the users on the wireless device 132 of FIG. 1.

Figure 3:
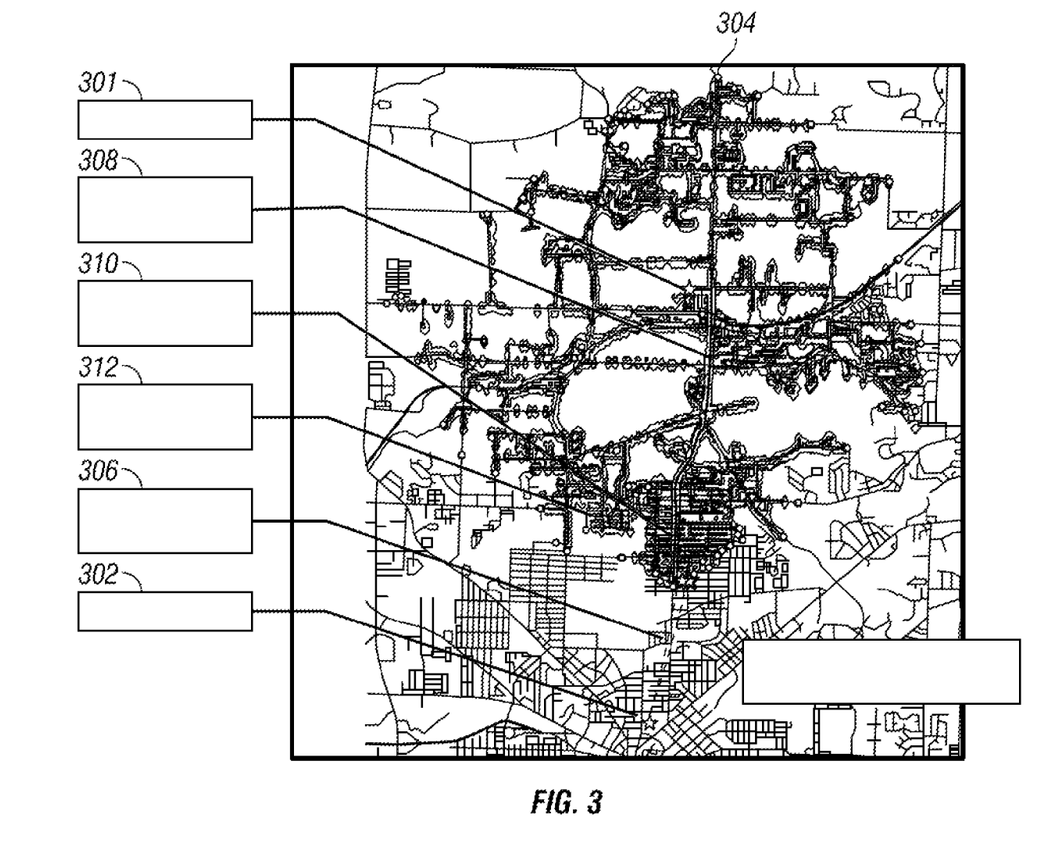
FIGS. 3 and 4 are graphical illustrations of exemplary implementations of the method of FIG. 2, in accordance with exemplary embodiments.

With reference to the first exemplary implementation of FIG. 3, if there is not sufficient availability of the primary energy source for the vehicle to travel between the origin 301 and the destination 302 of FIG. 3, the optimal route will include a first portion 308 using the primary energy source and a second portion 310 using the secondary energy source. FIG. 3 also shows various other searched alternatives 312, as well as a heuristic estimate of cost 306, per the discussion above.

Figure 4:
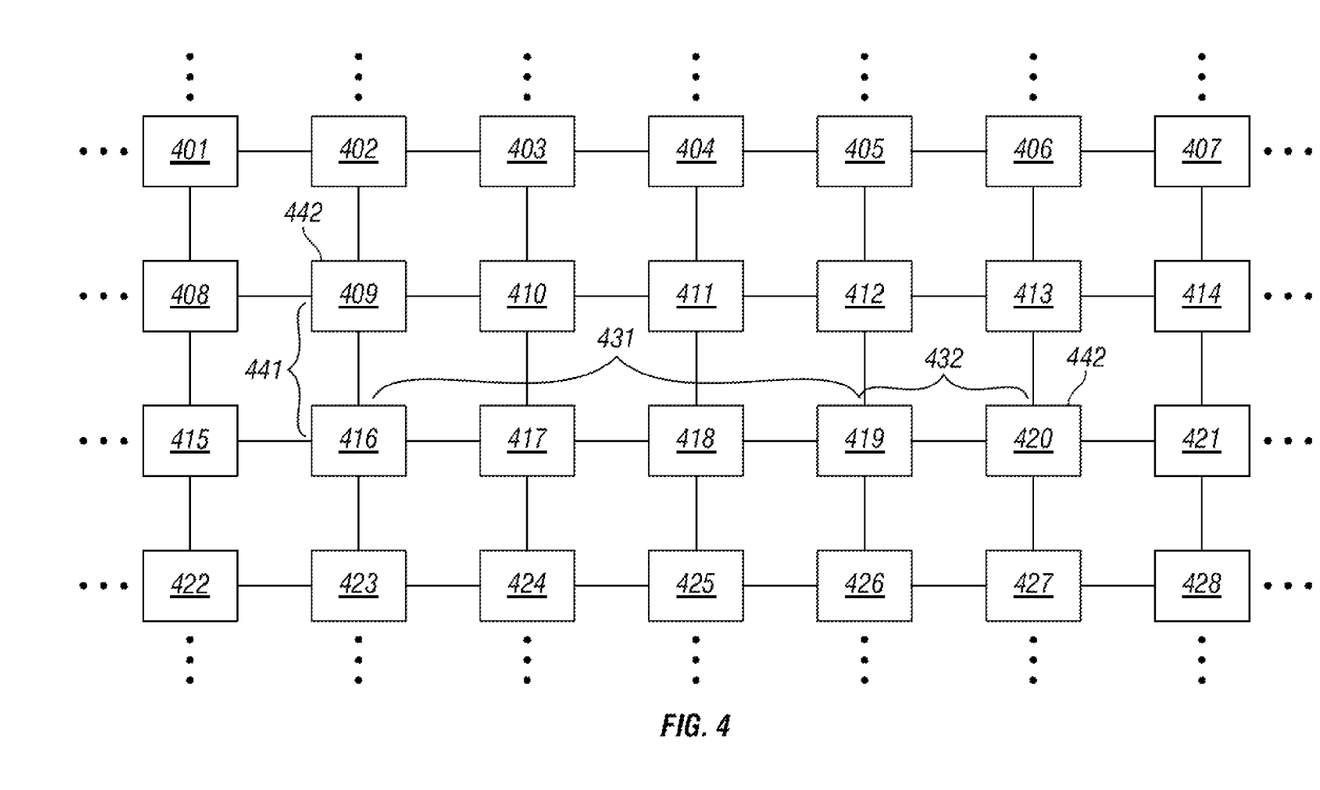

With reference to the second exemplary implementation of FIG. 4, and as discussed above, the optimal route of travel will depend upon the characteristics of the road segments between the nodes and the amount of the primary energy source available onboard the vehicle. For example, if there is a relatively large supply of the primary energy source (for example, electrical energy), then a more direct route may connect the origin 416 and the destination 420 via a city street stretching between nodes 416, 417, 418, 419, and 420, with a first portion 431 using the primary power source and a second portion 432 using the secondary power source (for example, gasoline). By way of further example, if there is a relatively small supply of the primary energy source (for example, electrical energy), then a more indirect route may connect the origin 416 and the destination 420 via a highway stretching between nodes 416, 409, 410, 411, 412, 413, and 420, with a first portion 441 using the primary power source and a second portion 442 using the secondary power source (for example, gasoline).

Accordingly, improved methods are providing for providing routing for automotive vehicles that optimize energy efficiency and/or minimizes energy-related costs based on an availability of a primary energy source (such as electric energy) and based on different respective functions for the primary energy source and the secondary energy source (such as gasoline or diesel fuel). In addition, improved systems and vehicles are provided that provide for such improved routing.

It will be appreciated that the disclosed vehicles, systems, and processes may differ from those depicted in the Figures and/or described above. For example, the navigation system 110 and/or various parts and/or components thereof (and/or of the vehicle 100) may differ from those of FIG. 1 and/or described above. Similarly, certain steps of the process 200 may be unnecessary and/or may vary from those depicted in FIGS. 2 and/or 3 and/or described above. It will similarly be appreciated that various steps of the process 200 may occur simultaneously or in an order that is otherwise different from that depicted in FIGS. 2 and/3 and/or described above. It will similarly be appreciated that, while the disclosed methods and systems are described above as being used in connection with automobiles such as sedans, trucks, vans, and sports utility vehicles, the disclosed methods and systems may also be used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. A method for providing routing for an automotive vehicle from a first location to a second location, the automotive vehicle configured to operate using a primary energy source and a secondary energy source onboard the automotive vehicle, the method comprising:
    ascertaining a measure of available energy from the primary energy source;
    ascertaining characteristics of a plurality of segments connecting the first location and the second location; and selecting, via a processor an optimized route between the first location and the second location using the measure of available energy and the characteristics of the plurality of segments.

2. The method of claim 1, further comprising:
estimating a heuristic energy cost of travelling between the first location and the second location using the primary energy source;
wherein the step of selecting the optimized route comprises:
selecting the optimized route using a first function of the primary energy source if the heuristic energy cost is less than the measure of available energy; and
selecting the optimized route using a second function of the secondary energy source if the heuristic energy cost is greater than the measure of available energy.

3. The method of claim 2, wherein the step of selecting the optimized route further comprises:
selecting the optimized route using a first scaling factor based on the first function if the heuristic energy cost is less than the measure of available energy; and
selecting the optimized route using a second scaling factor based on the second function if the heuristic energy cost is greater than the measure of available energy.

4. The method of claim 1, wherein the step of selecting the optimized route comprises:
identifying a current node for possible use in the optimized route;
identifying a plurality of neighbor nodes that are adjacent to the current node; and
selecting one of the plurality of neighbor nodes using a distance between the current node and each of the plurality of neighbor nodes and:
a first function of the primary energy source if the measure of available energy is sufficient for the automotive vehicle to travel between the first location and the current node; and
a second function of the secondary energy source if the measure of available energy is not sufficient for the automotive vehicle to travel between the first location and the current node.

5. The method of claim 1, wherein the step of selecting the optimized route comprises:
selecting the optimized route using the measure of available energy and a posted speed of each of the plurality of segments.

6. The method of claim 1, wherein the step of selecting the optimized route comprises:
selecting the optimized route using the measure of available energy and a concentration of traffic lights of each of the plurality of segments.

7. The method of claim 1, wherein the step of selecting the optimized route comprises:
selecting the optimized route using the measure of available energy and a real-time measure of traffic patterns of each of the plurality of segments.

8. A system for providing routing for an automotive vehicle from a first location to a second location, the automotive vehicle configured to operate using a primary energy source and a secondary energy source onboard the automotive vehicle, the system comprising:
an energy indicator configured to provide a measure of available energy from the primary energy source; and
a processor coupled to the energy indicator and configured to:
ascertain characteristics of a plurality of segments connecting the first location and the second location; and
select an optimized route between the first location and the second location using the measure of available energy and the characteristics of the plurality of segments.

9. The system of claim 8, further comprising:
an input device coupled to the processor and configured to obtain an input from a user of the automotive vehicle as to the second location; and
a receiver coupled to the processor and configured to ascertain the first location.

10. The system of claim 8, wherein the processor is further configured to:
estimate a heuristic energy cost of travelling between the first location and the second location using the primary energy source; and
select the optimized route using:
a first function of the primary energy source if the heuristic energy cost is less than the measure of available energy; and
a second function of the secondary energy source if the heuristic energy cost is greater than the measure of available energy.

11. The system of claim 10, wherein the processor is further configured to:
select the optimized route using a first scaling factor based on the first function if the heuristic energy cost is less than the measure of available energy; and
select the optimized route using a second scaling factor based on the second function if the heuristic energy cost is greater than the measure of available energy.

12. The system of claim 8, wherein the processor is further configured to:
identify a current node for possible use in the optimized route;
identify a plurality of neighbor nodes that are adjacent to the current node; and
select one of the plurality of neighbor nodes using a distance between the current node and each of the plurality of neighbor nodes and:
a first function of the primary energy source if the measure of available energy is sufficient for the automotive vehicle to travel between the first location and the current node; and
a second function of the secondary energy source if the measure of available energy is not sufficient for the automotive vehicle to travel between the first location and the current node.

13. The system of claim 8, wherein the processor is further configured to select the optimized route using the measure of available energy and a posted speed of each of the plurality of segments.

14. The system of claim 8, wherein the processor is further configured to select the optimized route using the measure of available energy and a concentration of traffic lights of each of the plurality of segments.

15. An automotive vehicle comprising:
an energy indicator configured to provide a measure of available energy from a primary energy source onboard the automotive vehicle;
a drive system configured to propel the automotive vehicle between a first location and a second location using:
a primary energy source, if the primary energy source is currently available; and a secondary energy source, if the primary energy source is not currently available onboard the automotive vehicle; and a processor coupled to the energy indicator and configured to:

ascertain characteristics of a plurality of segments connecting the first location and the second location; and select an optimized route between the first location and the second location using the measure of available energy and the characteristics of the plurality of segments.

16. The automotive vehicle of claim 15, wherein the processor is further configured to:

estimate a heuristic energy cost of travelling between the first location and the second location using the primary energy source; and select the optimized route using:

a first function of the primary energy source if the heuristic energy cost is less than the measure of available energy; and a second function of the secondary energy source if the heuristic energy cost is greater than the measure of available energy.

17. The automotive vehicle of claim 16, wherein the processor is further configured to:

select the optimized route using a first scaling factor based on the first function if the heuristic energy cost is less than the measure of available energy; and select the optimized route using a second scaling factor based on the second function if the heuristic energy cost is greater than the measure of available energy.

18. The automotive vehicle of claim 15, wherein the processor is further configured to:

identify a current node for possible use in the optimized route;

identify a plurality of neighbor nodes that are adjacent to the current node; and select one of the plurality of neighbor nodes using a distance between the current node and each of the plurality of neighbor nodes and:

a first function of the primary energy source if the measure of available energy is sufficient for the automotive vehicle to travel between the first location and the current node; and a second function of the secondary energy source if the measure of available energy is not sufficient for the automotive vehicle to travel between the first location and the current node.

19. The automotive vehicle of claim 15, wherein the processor is further configured to select the optimized route using the measure of available energy and a posted speed of each of the plurality of segments.

20. The automotive vehicle of claim 15, wherein the processor is further configured to select the optimized route using the measure of available energy and a concentration of traffic lights of each of the plurality of segments.

* * * * *